2,878,123

USE OF PROTEOLYTIC ENZYMES IN POULTRY FEED

Jack F. Beuk, Hinsdale, and John M. Hogan, Oak Lawn, Ill., assignors to Swift & Company, Chicago, Ill., a corporation of Illinois No Drawing. Application August 15, 1956
Serial No. 604,057

6 Claims. (Cl. 99—2)

This invention relates to improvements in altering certain physiological processes in poultry by inclusion in their diet of an effective amount of a proteolytic enzyme. The advantages that may be had by adding these materials include stimulation of growth of the fowl and improvement in feed efficiency. The invention encompasses the procedure for obtaining the favorable physiological effects as well as the compositions for improving the feed consumption and the growth rate.

In its broad aspects the procedure contemplates orally administering on a daily basis an effective dosage of a proteolytic enzyme or a mixture thereof in an amount sufficient to stimulate the growth of the fowl. It has been our experience that an amount of the proteolytic enzyme in excess of about 0.10 mg. per pound of the fowl's weight orally administered to the bird each day will bring about the desired results. The preferred range is from 0.10 mg. to 70.0 mgs. Amounts much in excess of 70.0 mgs. apparently give no appreciable increase in growth stimulation or improvement in feed efficiency, and our work indicates that the larger dosages of some enzymes may even decrease the advantage available at lesser levels. Various proteolytic enzymes, both of animal and vegetable sources are effective, and among these are: papain, trypsin, bromelin, pancreatin, ficin, and cathepsin. Papain is especially effective and has been found to give desirable results in amounts as low as 0.00044% based on the weight of the feed in which it is incorporated.

The enzyme may be administered to the fowl through incorporation in its feed, and when it is so incorporated it is advantageous that the enzyme be added to the feed in an amount in excess of 0.00044% based on the weight of the feed, and preferably within the range of 0.0022 and 0.022%. Another method of dispensing the enzyme is to include it as an ingredient in a mineral supplement or in a poultry feed concentrate. Mineral supplements conventionally include several ingredients, among these are dicalcium phosphate, limestone, sodium chloride, manganese sulphate, magnesium carbonate, copper sulphate, cobalt sulphate, zinc sulphate, iron sulphate, and potassium iodide. The mineral supplement is ordinarily added by the grower at the rate of 2% to 3% to the fowl's daily ration. The enzyme may be incorporated in this mineral supplement in amounts within the range of 0.11 to 0.73%, and at this level will assure adequate administration of the enzyme with the daily intake of the fowl's ration.

A poultry feed concentrate will normally contain the foregoing ingredients of the mineral supplement in addition to all or some of the following items: meat and bone scraps, soybean meal, alfalfa meal, and vitamins. The concentrate is diluted with grain, two to four parts of grain to one part of concentrate, to provide a fowl's daily ration. The enzymes are added to the poultry feed concentrate in an amount adequate to supply the enzymes in the recommended daily concentrations.

Proteolytic enzymes are useful as a supplement to the diet of ducks and turkeys as well as chickens. The enzyme supplement is particularly effective in giving added pounds in the growth of broiler chickens. The use of the enzyme supplement will greatly increase the normal digestive capacity of poultry to commercial feeding conditions. The utilization of the process of this invention makes possible the earlier marketing of fryers and broilers. The increased feed efficiency possible with some of the enzymes permits the raising of poultry to the same weight with less food. As will be seen from a study of Table IV, the lower levels of papain are preferred to the higher concentrations in chicken feeding. 0.2 gm. of papain per 100 lbs. of a broiler ration resulted in a 2.60 lb. average weight gain over a seven-week period, whereas a much higher concentration of 40.0 gms. of the same enzyme in 100 lbs. of the same chicken feed provided only a 2.35 lb. weight gain over the same period of time.

When the proteolytic enzyme is incorporated in a commercial poultry feed or in a protein containing concentrate by the manufacturer, it is desirable that the composition be kept relatively dry to forestall the possibility of the enzyme inactivation by other ingredients of the composition.

The following experiments involving turkey poults, chicks and ducklings were conducted to study the effect of supplementing conventional diets with small amounts of various proteolytic enzymes at varying levels. The fowl were fed ad libitum. Records were kept of the amount of feed consumed and the animals were weighed at the times indicated. Table I is the basal diet for the chicks, the experiments of which are reported in Examples I through IV. The basal diets of the ducklings and turkey poults are found in Tables II and III, respectively.

TABLE I

*Basal diet for chicks*

| Ingredients: | Parts by weight |
|---|---|
| Ground yellow corn | 51.3995 |
| Soybean oil meal | 20.00 |
| Meat and bone scraps | 5.00 |
| Fish meal | 2.00 |
| Corn gluten meal | 5.00 |
| Dehydrated alfalfa | 2.00 |
| Ground oats | 5.00 |
| Wheat middlings | 5.00 |
| Rock phosphate | 1.00 |
| Salt | 0.25 |
| Choline chloride | 0.20 |
| General vitamin supplement | 0.10 |
| Penicillin | 0.0375 |
| Vitamin $B_{12}$ supplement | 0.025 |
| 3-nitro, 4 hydroxy phenyl arsonic acid | 0.05 |
| Manganese sulphate | 0.025 |
| Vitamin D activated animal sterole | 0.05 |
| Vitamin A supplement | 0.023 |
| Tallow | 3.00 |

TABLE II
*Basal diet for ducklings*

| Ingredients | Parts by Weight | |
|---|---|---|
| | Duck Starter | Duck Grower |
| Ground Yellow Corn | 48.00 | 43.00 |
| Soybean Oil Meal | 20.75 | 15.25 |
| Pulverized Oats | 5.00 | 7.50 |
| Ground Barley | 5.00 | 5.00 |
| Wheat Standard Middlings | 5.00 | 10.00 |
| 17% Dehydrated Alfalfa Meal | 5.00 | 5.00 |
| Meat and Bone Scraps | 5.00 | 5.00 |
| Fish Meal | 2.00 | 2.00 |
| Defluorinated Rock Phosphate | 1.00 | 1.00 |
| Ground Limestone | 1.00 | 1.00 |
| Iodized Salt | 0.25 | 0.25 |
| Vitamin Supplement | 2.00 | 2.00 |
| Animal Fats | | 3.00 |

TABLE III
*Basal diets for turkey poults*

| Ingredients | Parts by Weight | |
|---|---|---|
| | Poult Starter | Poult Grower |
| Ground Yellow Corn | 31.00 | 16.96 |
| Pulverized Oats | 5.00 | 5.00 |
| Meat and Bone Scraps | 7.50 | 5.00 |
| Fish Meal | 2.50 | |
| Soybean Oil Meal | 42.20 | 20.00 |
| Dehydrated Alfalfa Meal | 5.00 | 10.00 |
| Animal Fat | 3.00 | |
| Defluorinated Rock Phosphate | 1.50 | 2.00 |
| Ground Limestone | 1.25 | 2.00 |
| Traces Mineral Premix | 0.25 | |
| Iodized Salt | 0.25 | 1.00 |
| Vitamin D Activated Animal Sterole | 0.05 | 0.80 |
| Vitamins, Amino Acid, Antibiotic, and Arsonic Growth Compound | 0.50 | |
| Wheat Middlings | | 20.00 |
| Wheat Standard Bran | | 12.50 |
| Pulverized Barley | | 5.00 |
| Vitamin B₁₂ and Antibiotic Supplement | | 0.20 |
| Choline Chloride | | 0.16 |
| General Vitamin Supplement | | 0.08 |
| Manganese Sulphate | | 0.02 |

EXAMPLE I

This example illustrates the effect of feeding very small amounts of papain and trypsin on the growth of young chicks. Young chicks of the same hatch were separated into five groups of fifteen birds each. The experiment was commenced when the birds were eight days old, and continued for seven weeks. The control group was fed a conventional broiler ration of the type described in Table I above. The other four groups were fed the same ration supplemented respectively by 0.2 gm., 20.0 gms., and 40.0 gms. papain per 100 lbs. of the ration. On a percentage basis, the three levels of papain calculated to 0.00044%, 0.044%, and 0.088% based on the weight of the broiler ration. The results of this experiment appear in the following Table IV.

TABLE IV
*Effect of papain and trypsin on growth of chicks*

| Group | Supplement | Average Weight Gain, Lbs./Bird | Feed Efficiency, Lbs. Feed/ Lbs. Gain |
|---|---|---|---|
| I | Control | 2.20 | 2.44 |
| II | 0.2 gm. Papain/100 lbs. Broiler Ration | 2.60 | 2.08 |
| III | 20.0 gm. Papain/100 lbs. Broiler Ration | 2.40 | 2.18 |
| IV | 40.0 gm. Papain/100 lbs. Broiler Ration | 2.35 | 2.15 |
| V | 20.0 gm. Trypsin/100 lbs. Broiler Ration | 2.36 | 2.28 |

It will be seen from the foregoing table that the control birds had an average gain per bird of only 2.20 lbs. over a seven-week period, with a feed efficiency of 2.44, which means that 2.44 lbs. of feed was required for each lb. of flesh added to the birds over the test period. The three groups of poultry fed papain supplemented diets each demonstrated an appreciable incerase in weight gain over that experienced by the control, with the lowest amount of papain supplement proving to be the most effective. It is estimated that on a dosage basis the birds of group II received on the average approximately 0.22 mg. of the papin daily. Papain is an enzyme derived from papaya and trypsin is derived from hog pancreas.

EXAMPLE II

This example shows the effectiveness of pancreatin and bromelin as enzyme supplements to the diet of young chicks. Four groups of chicks of twenty birds each were fed for a period of eight weeks on the diets indicated on Table V below. The broiler ration used as a basal diet is that described in Table I preceding. All of the birds at the outset of the test were one day old.

TABLE V
*Effect of pancreatin and bromelin on growth of chicks*

| Group | Supplement | Average Weight Gain, Lbs./Bird | Feed Efficiency, Lbs. Feed/ Lbs. Gain |
|---|---|---|---|
| I | Control | 2.69 | 2.61 |
| II | 20.0 gms. Pancreatin/100 lbs. Broiler Ration | 2.83 | 2.47 |
| III | 40.0 gms. Pancreatin/100 lbs. Broiler Ration | 3.09 | 2.40 |
| IV | 30.0 gms. Bromelin/100 lbs. Broiler Ration | 2.87 | 2.52 |

The control group of birds had an average weight gain of 2.69 lbs. at the end of the eighth week. The use of each of the proteolytic enzymes gave rise to increased weight gain over that of the control group and an increased feed efficiency.

EXAMPLE III

This example is concerned with the use of papain and ground beef spleen as supplements to the daily rations of chicks. Ground spleen contains appreciable amounts of the enzyme cathepsin. The basal diet of Table I was used as the daily diet of the several groups of birds of this example. Each group comprised twenty birds and was fed for eight weeks. The result of the experiment appears in Table VI below.

TABLE VI
*Effect of papain and ground beef spleen on growth of chicks*

| Group | Supplement | Average Weight Gain, Lbs./Bird | Feed Efficiency, Lbs. Feed/ Lbs. Gain |
|---|---|---|---|
| I | Control | 2.43 | 2.51 |
| II | 0.2 gm. Papain/100 lbs. Broiler Ration | 2.51 | 2.52 |
| III | 1.0 gms. Papain/100 lbs. Broiler Ration | 2.46 | 2.39 |
| IV | 10.0 gms. Papain/100 lbs. Broiler Ration | 2.52 | 2.39 |
| V | 3.0 lbs. Ground Beef Spleen/100 lbs. Broiler Ration | 2.57 | 2.33 |

EXAMPLE IV

Eighty young chicks were allotted to four groups of twenty birds each and three of the groups had their diets supplemented by the enzyme ficin in the amounts shown in Table VII below. Ficin is an enzyme derived from figs. The broiler ration referred to in the table is the basal diet described in Table I. It is interesting to note that 1.0 gm. of ficin incorporated in 100 lbs. of the broiler ration gave a larger increase in weight over the test period than did the larger amount of 10.0 gm. of ficin added to the same feed.

TABLE VII
*Effect of ficin on growth of chicks*

| Group | Supplement | Average Weight Gain, Lbs./Bird | Feed Efficiency, Lbs. Feed/Lbs. Gain |
|---|---|---|---|
| I | Control | 2.50 | 2.44 |
| II | 0.2 gm. Ficin/100 lbs. Broiler Ration. | 2.49 | 2.36 |
| III | 1.0 gm. Ficin/100 lbs. Broiler Ration. | 2.67 | 2.30 |
| IV | 10.0 gm. Ficin/100 lbs. Broiler Ration. | 2.58 | 2.42 |

EXAMPLE V

This example is concerned with the effect of papain on the growth of ducklings. Four groups of birds of twenty each were used for the experiment, with the experiment beginning when the ducklings were eight days old. The control, as shown in Table VIII, had an average weight gain per bird of 5.39 lbs. over the test period. Each level of papain proved to give an increase in weight gain over the control. The fowl were fed the duck starter ration of Table II for the first two weeks of the experiment and the duck grower diet of the same table for the balance of the feeding period.

TABLE VIII
*Effect of papain on growth of ducks*

| Group | Supplement | Average Weight Gain, Lbs./Bird |
|---|---|---|
| I | Control | 5.39 |
| II | 0.2 gm. Papain/100 lbs. Duck Mash | 5.45 |
| III | 1.0 gm. Papain/100 lbs. Duck Mash | 5.49 |
| IV | 10.0 gm. Papain/100 lbs. Duck Mash | 5.49 |

EXAMPLE VI

Four groups of turkey poults of twenty turkeys each were fed for nine weeks with three of the groups having their diets supplemented by papain. The poults were fed the starter diet of Table III for the first three weeks and the grower ration the rest of the test period. The average weight gain in pounds per group is set forth in Table IX below. Each of the groups receiving the papain supplement proved to have a significant weight gain advantage over the control group.

TABLE IX
*Effect of papain on growth of turkeys*

| Group | Supplement | Average Weight Gain, Lbs./Group |
|---|---|---|
| I | Control | 129.4 |
| II | 1.0 gm. Papain/100 lbs. Feed | 139.1 |
| III | 10.0 gm. Papain/100 lbs. Feed | 132.0 |
| IV | 20.0 gm. Papain/100 lbs. Feed | 140.0 |

In all the foregoing examples the use of the specified proteolytic enzymes proved to be advantageous in increasing growth. In most instances there was also improvement in feed efficiency. The enzymes are effective at extremely low levels, which makes it economically possible to use them as a supplement in the commercial feeding of poultry. Our work indicates that it is not desirable to use extremely high concentrations of the enzymes for the reason that the increased level does not increase growth over and beyond that possible with the extremely small concentrations, and as a matter of fact, in some instances there appears to be a depression of growth that is possible with the smaller levels.

The papain used in the foregoing examples was assayed by the method of Ball and Hoover, Journal of Biological Chemistry, 121:737 (1937), and found to have 0.2 milk clotting units per mg. The bromelin according to the same method, had 2500–3000 milk clotting units per gm. One gm. of the trypsin used will digest 80 gm. of casein when tested by the method found in the National Formulary, volume X, p. 415. One gm. of pancreatin, when assayed in accordance with the National Formulary method, was found to digest 100 gm. of casein. The ficin utilized in the above examples, tested in accordance with the beforementioned Ball and Hoover method, had 2.0 milk clotting units per mg.

Obviously many modifications and variations of the invention as hereinbefore set forth may be made without departing from the spirit and scope thereof, and therefore only such limitations should be imposed as are indicated in the appended claims.

We claim:

1. A method for improving the growth producing characteristics of a poultry feed which comprises adding to said feed at least about 0.00044 percent of a proteolytic enzyme based on the weight of the feed, said proteolytic enzyme being selected from the group consisting of papain, trypsin, bromelin, pancreatin, ficin and cathepsin, or a combination thereof.

2. A method for improving the growth producing characteristics of a poultry feed which comprises adding to said feed from about 0.0022 percent to about 0.022 percent of a proteolytic enzyme based on the weight of the feed, said proteolytic enzyme being selected from the group consisting of papain, trypsin, bromelin, pancreatin, ficin and cathepsin, or a combination thereof.

3. A method as in claim 1, wherein the proteolytic enzyme is papain.

4. A method as in claim 2, wherein the proteolytic enzyme is papain.

5. A method for improving the growth-producing characteristics of a poultry feed concentrate which comprises adding to said concentrate an amount of a proteolytic enzyme such that at least about 0.00044% of said proteolytic enzyme is added to a complete poultry feed.

6. A method for improving the growth-producing characteristics of a poultry feed concentrate which comprises adding to said concentrate an amount of a proteolytic enzyme such that from about 0.0022% to about 0.022% of said proteolytic enzyme is added to a complete poultry feed.

References Cited in the file of this patent
UNITED STATES PATENTS

| | | |
|---|---|---|
| 2,450,318 | Wagamon | Sept. 28, 1948 |
| 2,452,534 | Jeffreys | Nov. 2, 1948 |
| 2,700,611 | Jeffreys | Jan. 25, 1955 |

OTHER REFERENCES

Poultry Science, 25 (1946), p. 584.